May 7, 1968  H. P. SHERLOCK  3,382,121
PROCESS FOR PROVIDING HEAT RECOVERABLE SLEEVE
WITH FUSIBLE INSERT IN TIGHTLY HELD CONTACT
Filed March 12, 1965

*FIG. 1.*

HEAT RECOVERABLE ARTICLE

POST ORIENTATION EXPANSIBLE FUSIBLE INSERT

HEAT RECOVERABLE ARTICLE

*FIG. 2.*

EXPANDED FUSIBLE INSERT

INVENTOR.
HUGH PAUL SHERLOCK
BY
*Lyon & Lyon*
ATTORNEYS

3,382,121
PROCESS FOR PROVIDING HEAT RECOVERABLE SLEEVE WITH FUSIBLE INSERT IN TIGHTLY HELD CONTACT
Hugh Paul Sherlock, Menlo Park, Calif., assignor to Raychem Corporation, Redwood City, Calif., a corporation of California
Filed Mar. 12, 1965, Ser. No. 439,455
6 Claims. (Cl. 156—165)

ABSTRACT OF THE DISCLOSURE

The present invention relates to the preparation of tubular articles comprising a heat recoverable sleeve and a fusible insert according to which a post-orientation expansible insert having a peripheral dimension smaller than the internal dimension of the heat recoverable sleeve is placed within the sleeve and then subjected to heat sufficient to cause the insert to expand into tightly held contact with the sleeve, but insufficient to affect the heat recoverable sleeve.

BACKGROUND OF THE INVENTION

Heretofore, as disclosed in application Ser. No. 211,747 now U.S. Patent No. 3,243,211, the disclosure of which is incorporated herein by reference, there has been developed a recoverable article having a fusible insert. The recoverable portion of the article is generally composed of a material having the property of plastic or elastic memory and concentric with the insert in a sleeve-like fashion. These articles are capable of being laminated or otherwise united with another member in such a manner that a secure intimate and impervious bond is formed. The uniting of the recoverable article having the fusible insert with another member is usually accomplished by placing the member, such as a wire or cable, within a tubular recoverable article having a fusible insert, and thereafter heating sufficiently to cause the fusible insert to become fluid and to cause the recoverable member to urge the fusible insert toward the inserted member. For further details concerning the articles per se and their many uses, reference is made to assignee's copending United States patent application Ser. No. 211,747 now U.S. Patent No. 3,243,211, which is incorporated by reference herein.

The recoverable article containing the fusible insert has been previously prepared, for example, by placing the fusible insert over a mandrel and then fitting the heat recoverable outer portion over the mandrel followed by heating, which shrinks the sleeve until it closes down over the fusible insert. This procedure has been found to be time consuming and expensive. Alternatively, the recoverable member has been heated slightly to cause it to recover and securely engage the fusible member. However, this method has required careful control to avoid melting the fusible insert. Thus careless or unskilled performance of this method has resulted in many rejected articles and much waste.

Accordingly, it is an object of this invention to provide an improved method for the preparation of a recoverable article containing a fusible insert.

Another object of this invention is to provide a method for the preparation of a recoverable article containing a fusible insert, which is based on the ability of a longitudinally oriented fusible polymeric insert which has been increased in length and decreased in width to retract in length and expand in width when heated to a temperature sufficient to release the stresses induced by orientation. The orientation can be accomplished during extrusion or forming, or by cold drawing after extrusion or forming.

A further object of this invention is to provide a process for producing a recoverable article having a fusible insert without the use of a mandrel.

Other objects and advantages of the present invention will become apparent from the detailed description which follows.

In general, the present invention comprises a method for making a recoverable article having a fusible insert by employing an extruded or formed longitudinally oriented plastic insert which is placed adjacent to a recoverable member and thereafter heating the assembly to a temperature sufficient to release the stresses in the insert induced by orientation to cause the insert to retract in length and expand in width against and tightly cling to the recoverable member. In the assembly thus produced, the insert is brought into abutting relation to the recoverable member.

In general, the word "insert" as used in the description of the present invention, includes any member positioned such that it will be interposed between the recoverable material and an article with which the recoverable material is to be laminated, or otherwise united.

The fusible insert may comprise virtually any material which upon or after extrusion or forming is capable of being longitudinally oriented and can then be subsequently expanded by relaxation of the stresses induced by orientation at a temperature below the crystalline melting temperature of the recoverable material. For example, conventional thermoplastic materials, such as polyolefins (polyethylene, polypropylene, etc.), polyamides (e.g. nylon), polyvinyl chloride, polyesters (e.g. polyethylene terephthalate) and other similar materials can be used. Since it is the orientation which renders the inserts expansible, they may be said to be "post-orientation expansible."

The recoverable material used in the process of this invention is preferably a heat recoverable material having the property of plastic or elastic memory. There are several well known methods according to which recoverable materials may be deformed, such that they possess the property of plastic or elastic memory. Exemplary methods for imparting these properties are clearly disclosed in United States Patents Nos. 2,027,962 and 3,086,242 respectively, which are incorporated herein by reference. Any of the recoverable materials disclosed in the above-mentioned patents may be utilized in the present invention. Typical recoverable materials are the crosslinked polyolefins such as chemically or irradiation crosslinked polyethylene or materials possessing similar properties with regard to strength in the melt such as polytetrafluoroethylene.

It is fundamental to the invention that the fusible insert be first longitudinally oriented such that it is post-orientation expansible prior to being placed within the heat recoverable article. This treatment places the insert material into a condition where it is capable of expansion upon heating. The exact orientation technique required to impart any given degree of post-orientation expansion is dependent upon the composition, size, etc., of the insert. Orientation may be accomplished by using extrusion drawdown techniques which are well known in their application to plastic materials. Any of the conventional extrusion procedures familiar to those skilled in the art may be utilized in the preparation of the fusible insert. Orientation may also be accomplished by racking or cold drawing a material after extrusion or forming.

It will be understood that the fusible insert of the present invention may be such that it is capable of melting or becoming fluid at the same temperature as that required to cause the recoverable member to change size or shape, or it may be capable of melting at a higher or lower temperature than that required to cause the recoverable member to change dimension. Preferably the melting temperature of the fusible insert will be somewhat lower than the recovery temperature of the recoverable member.

Once the post-orientation expansible fusible insert has been prepared, it is placed, for example, within the outer recoverable member, the inside diameter of the recoverable member being slightly larger than the outside diameter of the fusible insert. The entire assembly is then heated to a temperature sufficient to release the stresses in the insert induced by orientation, but insufficient to cause substantial fusion of the insert. This may be accomplished, for example, by placing the entire assembly in an oven. At this temperature, the recoverable material is not affected, but the insert is caused to expand and tightly cling to the inner surface of the recoverable material. The expansion of the insert caused by the heating also produces a recession of the insert material from the outer ends. In some configurations this is desirable. In those cases where this recession is not desirable, the outer ends can be easily trimmed in order to provide uniformity throughout.

It will be readily apparent to those skilled in the art that a major utility of the present invention is associated with the production of generally tubular articles such as caps and sleeves. The cross-section of such articles may have any desired shape, e.g., square, triangular, rectangular, etc., but circular shapes are preferred.

In the drawings:

FIGURE 1 illustrates the outer heat recoverable article and expansible fusible insert prior to expansion of the latter.

FIGURE 2 illustrates the elements of FIGURE 1 after expansion of the insert according to the process of the present invention.

The following example is presented solely to illustrate the invention:

EXAMPLE

An extruded longitudinally oriented tube of an ethylene-ethyl acrylate copolymer (commercially known as Zetafin 35) with an outside diameter of less than 0.5 inch and a wall thickness of 0.35 inch was inserted within a heat shrinkable irradiated polyethylene tube with an expanded inside diameter of 0.5 inch. This assembly was then heated for 10 minutes in a 105° C. oven. The insert material expanded tightly against the outer sleeve. The assembly was carefully examined to ascertain that expansion and sealing had in fact occurred. The sealing at different locations along the length of the tube was checked by rolling the part between the thumb and forefinger, while listening closely for a cracking sound caused by the insert breaking away from the recoverable outer sleeve. No such sound was detected. All parts were then trimmed to the proper length.

In use, the article prepared according to the present invention is positioned with rleation to the article to which it is to be laminated or otherwise united in such relation that change in the dimensions of the recoverable material will cause it to urge the fusible member toward the article to which it is to be attached, and cause it to become bonded thereto. The article of the present invention is then subjected to sufficient heat to cause the fusible material to become fluid, and also cause the recoverable material to exercise its plastic or elastic memory property. This heating generally involves temperatures substantially in excess of that required to secure the insert by post-orientation expansion.

Having fully described the invention, it is intended that it be limited only by the lawful scope of the appended claims.

I claim:
1. A method of preparing a heat recoverable tubular article which is provided with a tightly held fusible insert, which comprises placing a post-orientation expansible fusible polymeric insert within a heat recoverable sleeve, and thereafter expanding the insert by the application of heat sufficient to cause said insert to expand into firm contact with said heat recoverable sleeve, but insufficient to affect said heat recoverable sleeve.

2. A method of preparing a heat recoverable tubular article which is provided with a tightly held fusible insert, which comprises placing a post-orientation expansible fusible polymeric insert within a heat recoverable sleeve, and thereafter heating the insert to a temperature sufficient to release the orientation stresses in the insert, but insufficient to cause fusion thereof, said temperature being sufficient to cause said insert to expand into substantially continuous firm contact with said heat recoverable sleeve, but insufficient to affect said heat recoverable sleeve.

3. Method of claim 1 wherein said insert is tubular.
4. The method of claim 1 wherein said heat recoverable sleeve comprises a crosslinked polymer.
5. The method of claim 4 wherein said sleeve comprises a chemically crosslinked polymer.
6. The method of claim 4 wherein said sleeve comprises an irradiation crosslinked polymer.

References Cited

UNITED STATES PATENTS 3,347,970   10/1967   Hanna _____ 264—230

EARL M. BERGERT, *Primary Examiner.*

HAROLD ANSHER, *Examiner.*